United States Patent [19]

Messenger

[11] 4,089,376

[45] May 16, 1978

[54] CEMENTING AGAINST EVAPORITES

[75] Inventor: Joseph U. Messenger, Dallas, Tex.

[73] Assignee: Mobil Oil Corporation, New York, N.Y.

[21] Appl. No.: 714,713

[22] Filed: Aug. 16, 1976

[51] Int. Cl.² .............................................. E21B 33/14
[52] U.S. Cl. ....................................... 166/293; 106/90
[58] Field of Search ............... 166/292, 293; 61/36 R, 61/36 B; 106/90

[56] References Cited

U.S. PATENT DOCUMENTS

| | | | |
|---|---|---|---|
| 2,805,719 | 9/1957 | Anderson | 166/292 |
| 2,961,044 | 11/1960 | Shell | 166/292 |
| 3,064,957 | 11/1962 | Jacoby | 166/292 X |
| 3,071,481 | 1/1963 | Beach et al. | 106/90 |
| 3,197,317 | 7/1965 | Patchen | 166/292 |
| 3,208,523 | 9/1965 | Coyle et al. | 166/292 |
| 3,360,046 | 12/1967 | Johnson et al. | 166/292 |
| 3,467,193 | 9/1969 | Messenger | 166/292 |
| 3,581,825 | 6/1971 | Messenger | 166/292 X |
| 3,937,282 | 2/1976 | Shryock | 166/293 |

*Primary Examiner*—Stephen J. Novosad
*Assistant Examiner*—George A. Suchfield
*Attorney, Agent, or Firm*—C. A. Huggett; Henry L. Ehrlich

[57] ABSTRACT

This specification discloses a method of cementing pipe in a well and discloses a cement slurry which may be used for cementing pipe against evaporite sections penetrated by the well. The cement slurry is formulated from hydraulic cement, silica flour, attapulgite, sodium chloride, weighting agent, dispersing and retarding agent, and water, and has a density within the range of about 13.0 to 21.0 pounds per gallon.

4 Claims, No Drawings

CEMENTING AGAINST EVAPORITES

BACKGROUND OF THE INVENTION

This invention relates to cementing pipe in a well drilled into the earth and more particularly is related to cementing pipe against evaporite sections penetrated by the well.

In the completion of a well drilled into the earth, pipe or casing is normally lowered into the well and a cement slurry is pumped down the well and up the annular spaced formed between the pipe and the wall of the well. The cement slurry is then maintained in the annular space to allow it to set and bond with the pipe and the wall of the well to thereby hold the pipe in place and to prevent fluids from flowing behind the pipe. Many different cements and cement slurries have been used for this purpose though portland cement and calcium aluminate cement are probably the most common cements. Various additives and formulations have been used with these cements in forming slurries having particularly desirable properties. For example, clays selected from the group of bentonite and attapulgite have been added to cement slurries as have sodium chloride, calcium chloride, dispersing agents, and gypsum.

In U.S. Pat. No. 3,197,317 to Freeman D. Patchen there is described a low density cement for use in wells. Patchen found that attapulgite may be added to portland cement slurries to effectively reduce the density of the slurry. U.S. Pat. No. 3,581,825 to Joseph U. Messenger was directed to a method of cementing wells wherein slurries of calcium aluminate cement and clay selected from the group of bentonite, attapulgite, and mixtures thereof, were used. These slurries were particularly applicable for use in cementing behind casing in permafrost zones. In U.S. Pat. No. 3,937,282 to Stanley H. Shryock et al. there is described another composition for cementing casing in wells drilled through permafrost zones. The Shyrock et al. slurry consists essentially of a hydraulic cement, gypsum, a monovalent chloride salt, and a setting time retarding agent and water. In U.S. Pat. No. 3,071,481 to Horace J. Beach et al. there is described a gel cement composition for use in cementing wells. This composition consists essentially of a hydraulic cement, a colloidal clay, sodium chloride or calcium chloride, and an organic dispersing agent. In U.S. Pat. No. 3,467,193 to Joseph U. Messenger there is described still another cement composition for use in cementing wells. This cement composition describes the use in a slurry of hydraulic cement of a turbulence inducer and silica or diatomaceous earth particles having sizes of from 0.1 to about 44 microns in diameter.

SUMMARY OF THE INVENTION

This invention is directed to a method of cementing pipe in well penetrating the earth wherein a pumpable cement slurry is formed and then positioned and maintained in the annular space between the pipe and the wall of the well to allow it to set and bond the pipe to the wall of the well. The pumpable cement slurry is comprised of hydraulic cement, silica flour, attapulgite, sodium chloride, weighting agent, dispersing and retarding agent, and water, and has a density within the range of about 13.0 to 21.0 pounds per gallon. The silica flour is present in the slurry in an amount within the range of about 30 to 40 percent based on cement; the attapulgite is present in an amount within the range of about 0.1 to 4.0 percent based on cement; the dispersing and retarding agent is present in an amount within the range of about 0.05 to 1 percent based on cement; the sodium chloride is present in an amount within the range of about 18 to 37 percent based on mixing water; and the weighting agent is present in a sufficient amount to provide a density of the cement slurry within the range of about 13.0 to 21.0 pounds per gallon.

DESCRIPTION OF THE PREFERRED EMBODIMENTS

This invention is directed to a method for cementing a well and more particularly to a method for cementing pipe such as well casing in a well.

In the completion of a well drilled into the earth, it is the usual practice to case the well. This is done by running casing or pipe into the well and pumping a cement slurry down the well and up the annulus formed intermediate the outside of the pipe and the wall of the well and maintaining the cement slurry there to allow it to set and bond the pipe to the wall of the well.

Severe problems have occurred in cementing pipe against evaporite sections penetrated by a well. Evaporites or evaporite sections are formations formed in geological time by the evaporation of waters and deposition of minerals therefrom. Such formations include potassium and magnesium salts normally overlying sodium salts. It is thought that the problem of cementing against evaporites arises because the cement slurries used for bonding the pipe to the formation face do not bond to the potassium and magnesium salt sections of the evaporites. The result is that the evaporites are dissolved and sloughed into the well and degrade the cement slurry. This results in a cavity being formed in the evaporite section about the well and provides room for the evaporites to "plastic flow" and place a non-uniform load on the casing in the well which results in collapsing or deflecting the casing.

I have discovered a cement slurry which may be used in cementing casing against evaporites, which slurry will set and bond the casing to the evaporites and thereby avoid the forming of the cavity which allows a plastic flow of the evaporites and resulting damage to the casing. This cement slurry may also be used in wells that do not penetrate evaporite sections.

In accordance with this invention there is described a method of cementing pipe in a well that penetrates the earth. A pumpable cement slurry is formed that is comprised of hydraulic cement, silica flour, attapulgite, sodium chloride, weighting agent, dispersing and retarding agent, and water, which slurry has a density within the range of about 13.0 to 21.0 pounds per gallon. This slurry is circulated down the well and positioned in the annular space formed intermediate the pipe and the wall of the well and maintained there to allow the slurry to set and bond the pipe to the wall of the well. Preferably in the formulation of the cement slurry, Class G portland cement is used and silica flour is present in an amount within the range of 30 to 40 percent, attapulgite in an amount within the range of .1 to 4 percent, dispersing and retarding agent in an amount within the range of .05 to 1 percent, all based on the weight of cement, and weighting agent is present in a sufficient amount to provide a density of the cement slurry within the range of 15.8 to 21.0 pounds per gallon and sodium chloride is present in an amount within the range of 18 to 37 percent based on mixing water. The preferred dispersing and retarding agent is d-glucono delta lactone which is available under the trade name of CFR-1 from Halliburton Services and is described in the COMPOSITE CATALOG OF OIL FIELD EQUIPMENT AND SERVICES, 1976–77, Vol. 2, p. 2910. Hematite is the preferred weighting agent and is preferred because of its high density.

In accordance with a preferred embodiment a cement slurry is used for cementing pipe against evaporites, which slurry has a composition of Class G portland cement, 35 percent silica flour, 1.0 percent attapulgite, 37.2 percent sodium chloride based on water, 31.9 percent hematite, 0.3 percent d-glucono delta lactone (CFR-1) mixed in 6.5 gallons of fresh water per 94 pounds of cement to weigh 17.2 pounds per gallon and yield 1.80 cubic feet per 94 pounds of cement. This slurry was tested to determine the effects of magnesium chloride. The plastic viscosity and yield point of the slurry were determined and the slurry was then brought to 170° F. (77° C.) using a Halliburton consistometer. At this point 5 volume percent of a 20-weight percent solution of magnesium chloride ($MgCl_2$) was added and the plastic viscosity and yield point of the slurry again determined. Before adding 5 weight percent of the 20 weight percent $MgCl_2$ solution, the slurry had a plastic viscosity of 39 centipoises (cp), a yield point of 31 pounds per 100 square feet (lb/100 sq. ft.), and an initial-gel of 15 lb/100 sq. ft. After adding the $MgCl_2$ solution, the slurry had a plastic viscosity of 37, a yield point of 45, and an initial-gel of 32 showing superior resistance to $MgCl_2$. At 212° F. in 24 hours the slurry set and developed 881 pounds per square inch (psi) of compressive strength.

It is considered that this general slurry is stable to $MgCl_2$ contamination because the slurry contains four components not affected by $MgCl_2$ when first mixed. These are silica, attapulgite, hematite, and d-glucono delta lactone. At elevated temperatures, the silica reacts with the lime released when the cement sets to form a cementitious material which also sets, but does not form until the cement is in place. The d-glucono delta lactone, dispersant and retarder, performs both in the presence of sodium chloride (NaCl) and $MgCl_2$, and attapulgite is not adversely affected by $MgCl_2$. The weight of this general slurry can be varied from 15.8 to 21.0 lb/gal. by selecting the amount of hematite used and from 15.8 to 13.0 pounds per gallon by adjusting the amounts of water and attapulgite, its rheological properties adjusted so that it flows well and does not separate water by varying the concentration of attapulgite, and the thickening time and rheological properties can be controlled by varying the concentration of the dispersant and retarder. This general slurry is considered ideal for cementing against evaporites over a temperature range of 150°–350° F. (66°–177° C.).

The problem that occurs in cementing pipe against evaporite sections containing magnesium ions results because magnesium ions react with the hydraulic cement of the slurry (active solids) to rapidly and greatly increase the viscosity of the slurry to the point that it can no longer be pumped. The slurry of this invention is designed to combat this problem by diluting the hydraulic cement content of the slurry with inactive solids to the point that the magnesium ions may react with the diluted hydraulic cement without creating an unpumpable slurry. By the design of this slurry, there is provided however a sufficient amount of hydraulic cement to set and develop adequate compressive strength. The dilution of the hydraulic cement is brought about by the inclusion of attapulgite and silica flour, both of which are inert to magnesium ions and both of which have a mixing water requirement. Thus, the mixing this composition with water to obtain a pumpable slurry, larger amounts of water are required to compensate for the presence of the attapulgite and silica flour. The water is the principal diluting agent. Evaporite sections contain massive amounts of sodium chloride as well as magnesium and potassium salts. Thus, the inclusion of sodium chloride in the cement slurry in an amount of at least 18 percent allows the cement slurry to bond against the sodium chloride portion of the evaporite. Weighting agent is included in the cement slurry to obtain a cement slurry density sufficient to control the well and to provide a slurry density of about 1 pound per gallon greater than the density of the mud in the well and thus provide for efficient displacement of the slurry down the well and up the annulus surrounding the pipe. A dispersing agent which is compatible with all encountered concentrations of sodium chloride and magnesium salts is provided in this slurry to adjust the yield point and gel strength of the slurry such that the solids, in particular the weighting agent, are suspended in the slurry. The slurry must be retarded to prevent the premature setting thereof. The preferred dispersing agent for use in this invention is d-glucono delta lactone which is also a retarding agent. The silica flour used in this slurry serves a dual purpose. It provides for added dilution water and reacts at formation temperatures with the lime released when the hydraulic cement sets to form a cementitious material which provides additional compressive strength to the set slurry.

I claim:

1. A method of cementing a pipe in a well penetrating the earth, comprising the steps of:
   (a) forming a pumpable cement slurry comprised of hydraulic cement, silica flour in an amount within the range of 30 to 40 percent based on cement, attapulgite in an amount within the range of 0.1 percent to 4 percent based on cement, sodium chloride in an amount within the range of 18 to 37 percent based on mixing water, d-glucons delta lactone in an amount within the range of 0.05 to 1 percent based on cement, water and hematite in an amount to provide a density of said cement slurry within the range of about 13 to 21 pounds per gallon;
   (b) positioning said slurry in the annular space formed intermediate said pipe in the wall of said well; and
   (c) maintaining said slurry in said annular space to allow said slurry to set and bond said pipe to said wall of said well.

2. In a method of cementing pipe in a well against an evaporite section containing a sodium chloride salt penetrated by said well, the improvement comprising:
   (a) forming a pumpable cement slurry comprised of hydraulic cement, silica flour in an amount within the range of 30 to 40 percent based on cement, attapulgite in an amount within the range of .1 to 4 percent based on cement, sodium chloride in an amount within the range of 18 to 37 percent based on mixing water, d-glucono delta lactone is an amount within the range of 0.05 to 1 percent based on cement, hematite in an amount to provide a slurry density within the range of 13 to 21 pounds per gallon, and water;
   (b) positioning said pumpable slurry in the annular space formed intermediate said pipe and said evaporite section; and (c) maintaining said slurry in said annular space to allow said slurry to set and bond said pipe to said evaporite section.

3. The method of claim 2 wherein said pumpable aqueous cement slurry is comprised of Class G portland cement, 35 percent silica flour, 1.0 percent attapulgite, 37.2 percent sodium chloride based on water, 31.9 percent hematite, and 0.3 percent d-glucono delta lactone, and mixed with 6.5 gallons of fresh water per 94-pound sack of said cement to yield a pumpable slurry having a density of 17.2 pounds per gallon.

4. A method of cementing a pipe in a well penetrating the earth, comprising the steps of:
 (a) forming a pumpable cement slurry comprised of hydraulic cement, silica flour in an amount within the range of 30 to 40 percent based on cement, attapulgite in an amount within the range of 0.1 percent to 4 percent based on cement, sodium chloride in an amount within the range of 18 to 37 percent based on mixing water, d-glucono delta lactone in an amount within the range of 0.05 to 1 percent based on cement, water and weighting agent in an amount to provide a density of said cement slurry within the range of about 13 to 21 pounds per gallon;
 (b) positioning said slurry in the annular space formed intermediate said pipe in the wall of said well; and
 (c) maintaining said slurry in said annular space to allow said slurry to set and bond said pipe to said wall of said well.

* * * * *